United States Patent [19]

Yamagami et al.

[11] Patent Number: 5,629,830
[45] Date of Patent: May 13, 1997

[54] SOLID STATE ELECTROLYTIC CAPACITOR HAVING A CONCAVE

[75] Inventors: Mamoru Yamagami; Makoto Aoyama, both of Kyoto, Japan

[73] Assignee: Rohm Co., Ltd., Kyoto, Japan

[21] Appl. No.: 452,436

[22] Filed: May 26, 1995

[30] Foreign Application Priority Data

May 27, 1994 [JP] Japan .................................. 6-115074

[51] Int. Cl.⁶ ............................................ H01G 2/10
[52] U.S. Cl. ........................... 361/535; 361/529; 361/528; 361/532
[58] Field of Search .............................. 361/535, 523, 361/524, 528, 531, 532, 434, 533, 516, 509, 518, 508, 503, 517, 529; 29/25.03

[56] References Cited

U.S. PATENT DOCUMENTS 4,231,075  10/1980  Morimoto et al. .

5,390,074  2/1995  Hasegawa et al. ................. 361/540

FOREIGN PATENT DOCUMENTS

0538651A2  4/1993  European Pat. Off. ............. 361/535

*Primary Examiner*—Leo P. Picard
*Assistant Examiner*—Anthony Dinkins
*Attorney, Agent, or Firm*—Nikaido Marmelstein Murray & Oram LLP

[57] ABSTRACT

In a solid state electrolytic capacitor, an increase in capacity and a reduction in size and weight are intended. A concave is formed in one end surface of a porous chip formed by hardening metal powder and a synthetic resin is filled in the concave. An anode bar is provided which passes through the synthetic resin to be fixed to the chip. After a dielectric film is formed on the surface of the chip through anodic oxidation, a solid state electrolytic layer made of manganese dioxide is formed on the dielectric film and then, a cathode film is formed thereon. At an end surface of the chip, an insulating film is provided, so that the distance between the lead terminal and the chip is reduced without any short circuit being caused.

6 Claims, 7 Drawing Sheets

5,629,830

SOLID STATE ELECTROLYTIC CAPACITOR HAVING A CONCAVE

BACKGROUND OF THE INVENTION

1. Field of the Invention

The present invention relates to an improvement of the structure of a solid state electrolytic capacitor such as a tantalum solid state electrolytic capacitor and an aluminum solid state electrolytic capacitor.

2. Description of the Prior Art

Conventionally, solid state electrolytic capacitors of this type include, for example, a solid state electrolytic capacitor A described in Japanese Laid-open Patent Application No. S60-220922 and structured as shown in FIG. 1 and a solid state electrolytic capacitor B having a safety fuse described in Japanese Laid-open Patent Application No. H2-105513 and structured as shown in FIG. 2.

Specifically, the former solid state electrolytic capacitor A is formed in the following manner: A capacitor device 1 including a chip 1a, an anode bar 1b protruding from one end surface 1a' of the chip 1a and a cathode film 1c formed on the surface of the chip 1a except on the end surface 1a' is arranged between a pair of left and right lead terminals 2 and 3 by fixing the anode bar 1b of the capacitor device 1 to one lead terminal 2 and by directly connecting the cathode film 1c of the chip 1a of the capacitor device 1 to the other lead terminal 3, and then, the entire structure is encapsulated in a packaging member 4 such as a synthetic resin made mold.

The latter solid state electrolytic capacitor B having a safety fuse is formed in the following manner: a capacitor device 1 of a similar structure is arranged between a pair of left and right lead terminals 2 and 3' by fixing an anode bar 1b of the capacitor device 1 to the lead terminal 2 and by connecting a cathode film 1c of the chip 1a of the capacitor device 1 to the other lead terminal 3' by a safety fuse 5 such as a soldering wire which melts by an excess current or by an increase in temperature, and then, the entire structure is encapsulated in a packaging member 6 such as a synthetic resin made mold.

In the solid state electrolytic capacitors A and B, the lead terminals 2, 3 and 3' are formed to be of a surface mounted type so that they are mounted on a printed circuit board by bending them toward the bottom surfaces of the packaging members 4 and 6.

To manufacture the capacitor device 1 used for the solid state electrolytic capacitors A and B, the following method is employed: First, powder of a metal such as tantalum is shaped into a porous chip 1a so that the anode bar 1b protrudes from the end surface 1a' of the chip 1a, and then, the powder is sintered. Then, as shown in FIG. 3, the porous chip 1a is drenched in a chemical conversion solution C such as an aqueous solution of phosphoric acid so that the end surface 1a' of the chip 1a is at a depth H from the surface of the solution C, and a direct current is applied between the anode bar 1b and the chemical conversion solution C under this condition to cause anodic oxidation, so that a film D of a dielectric substance such as tantalum pentoxide is formed on the surface of the metal powder on the chip 1a and that a film D' of a dielectric substance such as tantalum pentoxide is formed at a portion corresponding to the length H on the periphery at the root of the anode bar 1b.

Then, as shown in FIG. 4, the chip 1a is drenched in an aqueous solution E of manganese nitrate until the solution E permeates into the chip 1a and then taken out from the solution E and sintered. By repeating this a plurality of times, a layer F of a solid state electrolyte such as manganese dioxide is formed on the surface of the film D of a dielectric substance such as tantalum pentoxide and the cathode film 1c made of a metal such as silver or nickel is formed on the surface of the chip 1a except on the end surface 1a' with a graphite film between.

In the process of manufacturing the capacitor device 1, when the layer F of a solid state electrolyte such as manganese dioxide is formed, the aqueous solution E of manganese nitrate permeates beyond the film D' of a dielectric substance such as tantalum pentoxide formed at the root of the anode bar 1b to above the film D' to form a layer F of a solid state electrolyte such as manganese dioxide there, so that the layer F of a solid state electrolyte such as manganese dioxide and the anode bar 1b electrically short-circuit. As a result, an inferior capacitor device is produced.

Conventionally, to reduce the production of inferior capacitor devices due to the over-percolation of the aqueous solution E of manganese nitrate in forming the layer F of a solid state electrolyte such as manganese dioxide, after the completion of the process of forming the film of a dielectric substance such as tantalum pentoxide, a synthetic resin G such as silicon resin is applied to the root of the anode bar 1b as shown in FIG. 5 or a ring member J made of a synthetic resin such as silicon resin is fixed to the root of the anode bar 1b as shown in FIG. 6.

In assembling the solid state electrolytic capacitors A and B shown in FIGS. 1 and 2 by using the capacitor device 1 thus manufactured, it is necessary for the lead terminal 2 to be away from the end surface 1a' of the chip 1a at a distance corresponding to a height T' or T" of the synthetic resin G or the ring member J provided at the root of the anode bar 1b where it is fixed to the end surface 1a'. In other words, a distance W' between the lead terminal 2 and the end surface 1a' of the chip 1a should be increased by an amount for providing the synthetic resin G or the ring member J at the root of the anode bar 1b. The distance W' is added to the total length L' of the solid state electrolytic capacitor.

Therefore, when the length L' of the solid state electrolytic capacitor A is predetermined, it is necessary to reduce the length, i.e. the volume of the chip 1a of the capacitor device 1 by an amount for providing the synthetic resin G or the ring member J. This leads to a decrease in capacitance of the solid state electrolytic capacitor. When the capacitance of the solid state electrolytic capacitor is predetermined, it is necessary to increase the length L' of the solid state electrolytic capacitor A by an amount for providing the synthetic resin G and the ring member J. This leads to an increase in size and weight of the solid state electrolytic capacitor.

In particular, in the solid state electrolytic capacitor B having a safety fuse shown in FIG. 2, it is also necessary to provide a considerable distance S' between the other lead terminal 3' and the chip 1a of the capacitor device 1 in order for the other lead terminal 3' not to be in contact with the cathode film 1c of the chip 1a, and the distance S' is added to the total length L". This leads to a decrease in capacitance and an increase in size and weight.

SUMMARY OF THE INVENTION

An object of the present invention is to provide a solid state electrolytic capacitor enabling an increase in capacity and a reduction in size and weight.

To achieve the above-mentioned object, according to the present invention, in a solid state electrolytic capacitor provided with a capacitor device having a porous chip formed by hardening a metal powder and an anode bar protruding from one end surface of the chip, wherein a dielectric film, a solid state electrolytic layer and a cathode film are successively formed on a surface of the chip, with a first lead terminal connected to the anode bar, and with a second lead terminal connected to the cathode film, a concave in which a synthetic resin is filled is formed in the end surface of the chip, and the anode bar passes through the synthetic resin to be fixed to the chip.

An insulating film is formed on an end surface of the chip. The insulating film may be formed on the end surface from which the anode bar protrudes or an end surface at a reverse side thereof, or on both of the end surfaces.

In the structure where the synthetic resin is filled in the concave formed in an end surface of the chip and the anode bar passes through the synthetic resin to be fixed to the chip, the infiltration of the solution which occurs in forming the solid state electrolytic layer is prevented by the synthetic resin, so that the solid state electrolytic layer is formed so as not to be in contact with the anode bar. Consequently, the production of inferior capacitors due to short circuit is prevented. Further, since the resin does not protrude from the end surface, the size of the solid state electrolytic capacitor is reduced.

In addition, by forming the insulating film on an end surface of the chip, the lead terminals can be arranged close to or in contact with the chip without any electric short circuit being caused. As a result, the size of the solid state electrolytic capacity is further reduced.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Hereinafter, embodiments of the present invention will be described with reference to the drawings.

Figure 1:
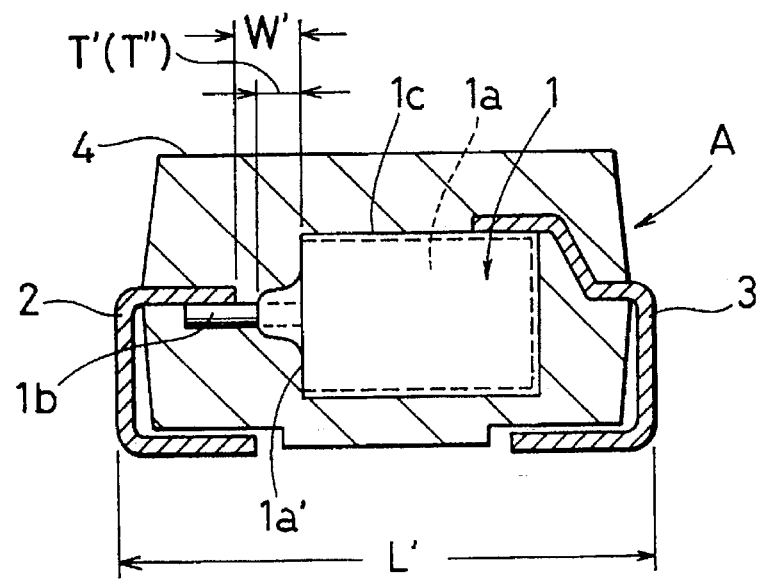
FIG. 1 is front longitudinal sectional view of the conventional solid state electrolytic capacitor.
Figure 2:
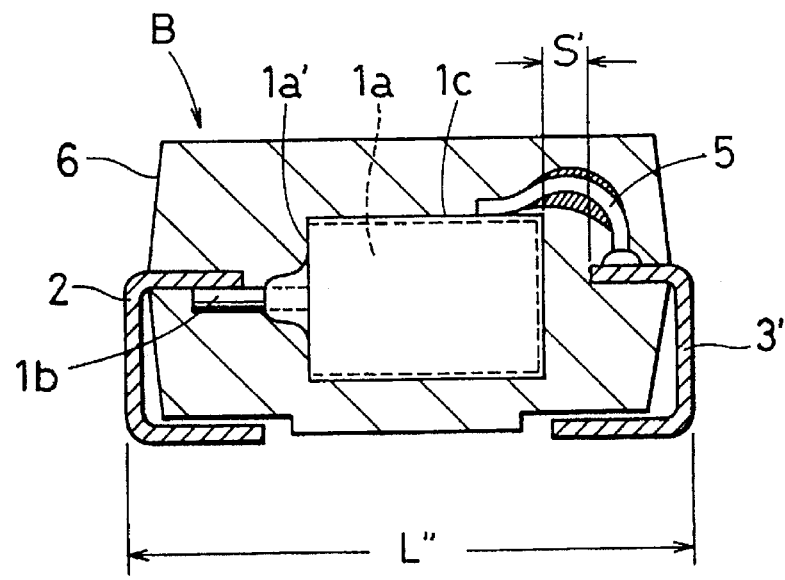
FIG. 2 is a front longitudinal sectional view of the conventional solid state electrolytic capacitor having a safety fuse.
Figure 3:
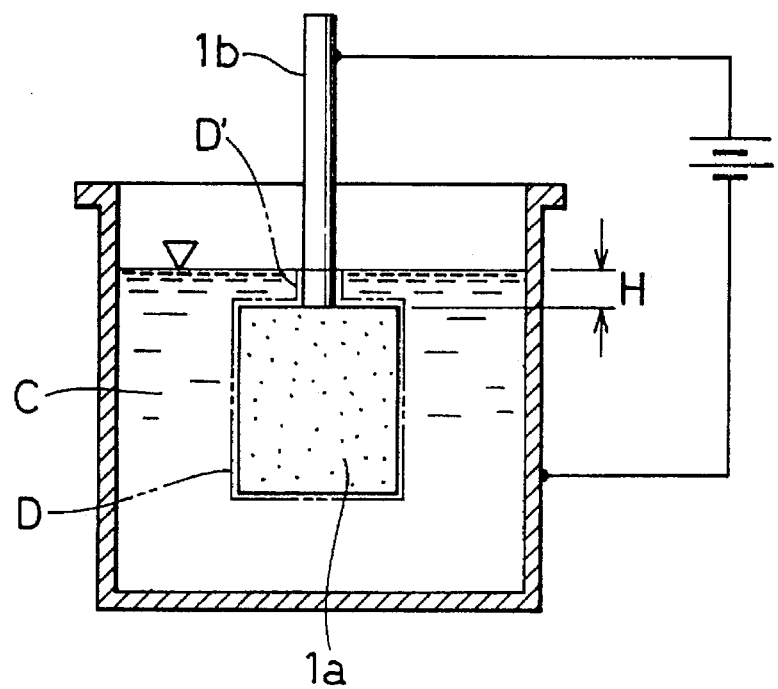
FIG. 3 is a view showing the condition where the dielectric film is formed on the chip of the capacitor.
Figure 4:
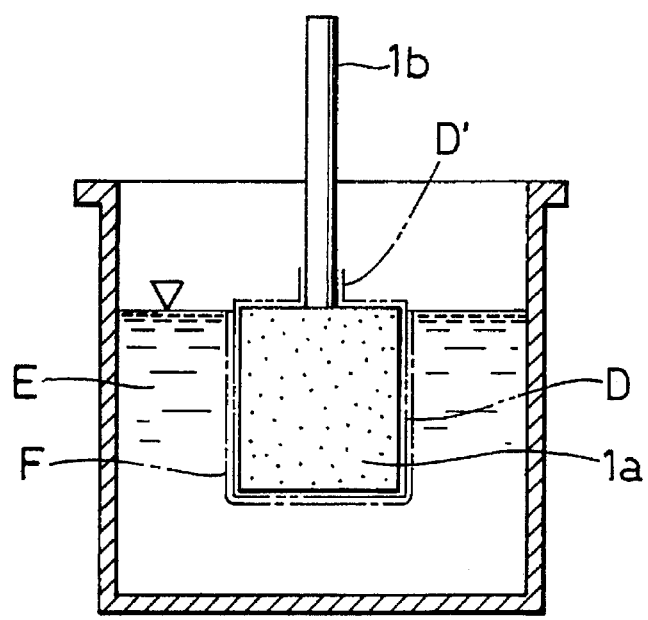
FIG. 4 is a view showing the condition where the layer of a solid state electrolyte is formed on the chip of the capacitor device subsequently to the formation of the dielectric film.
Figure 5:
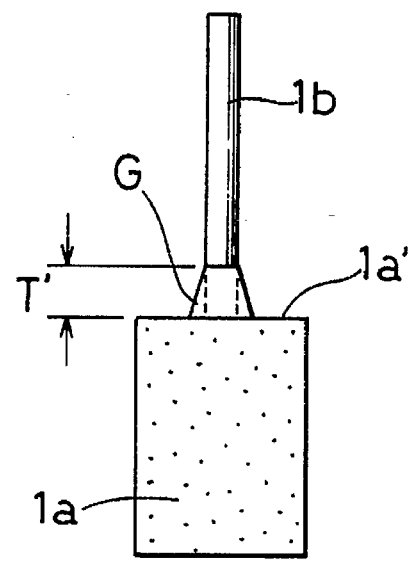
FIG. 5 is a front view showing the conventional capacitor device.
Figure 6:
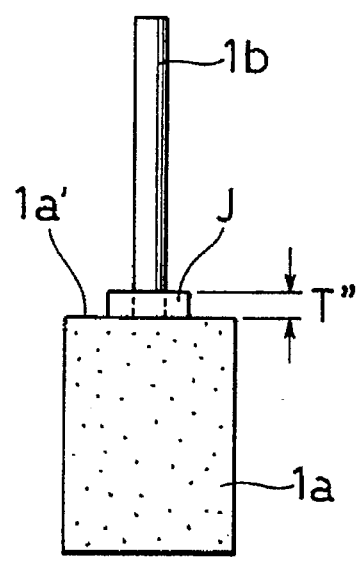
FIG. 6 is a front view showing the conventional capacitor device.
Figure 7:
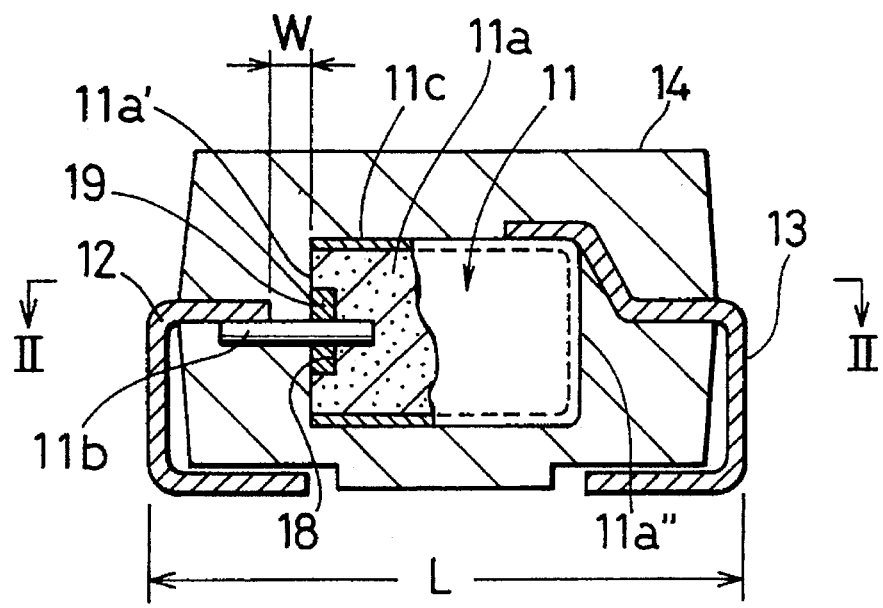
FIG. 7 is a front longitudinal sectional view of the solid state electrolytic capacitor according to a first embodiment of the present invention.
Figure 8:
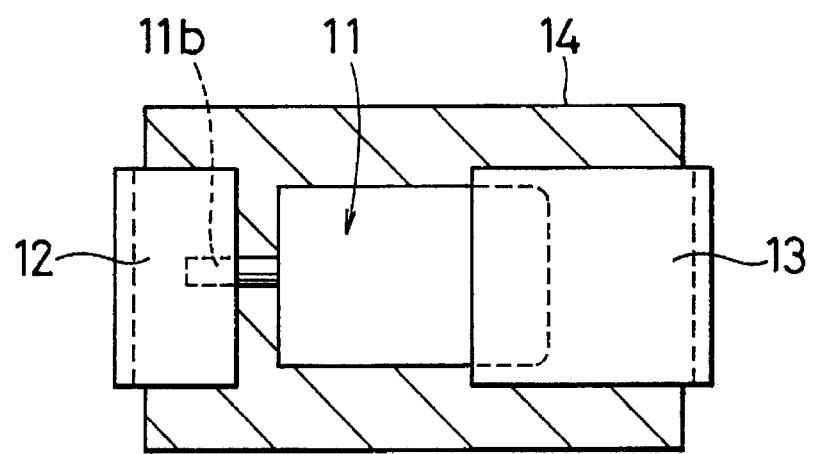
FIG. 8 is a cross-sectional view taken on line II—II of FIG. 7.

FIGS. 7 and 8 show a first embodiment. Referring to these figures, reference designation 11 represents a capacitor device. The capacitor device 11 includes a chip 11a which is made by hardening and sintering powder of a metal such as tantalum into a porous body and an anode bar 11b protruding from an end surface 11a' of the chip 11a. A cathode film 11c is formed on the surface of the chip 11a except on the end surface 11a'. The material for the chip 11a is not limited to tantalum but another metal such as aluminum powder may be used.

The capacitor device 11 is arranged between a pair of left and right plate-shaped metallic lead terminals 12 and 13. The anode bar 11b of the capacitor device 11 is fixed to the lead terminal 12 and the other lead terminal 13 is connected directly to the cathode film 11c of the chip 11a of the capacitor device 11. Further, the entire structure is encapsulated in a molding member 14 made of synthetic resin and the lead terminals 12 and 13 are bent toward the bottom surface of the molding member 14.

Moreover, a concave 18 is provided in the end surface 11a' of the chip 11a of the capacitor device 11 so that the anode bar 11b protrudes from the concave 18. A synthetic resin 19 such as silicon resin or epoxy resin which is insulating and water-repellent is filled in the concave 18 so as to cover the root of the anode bar 11b. Thus, the anode bar 11b passes through the synthetic resin 19 to be fixed to the chip 11a.

Figure 9:
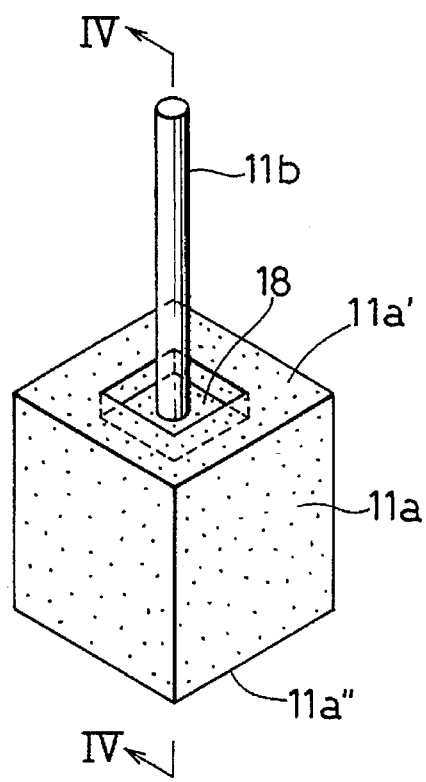
FIG. 9 is a perspective view of the chip of the capacitor device.
Figure 10:
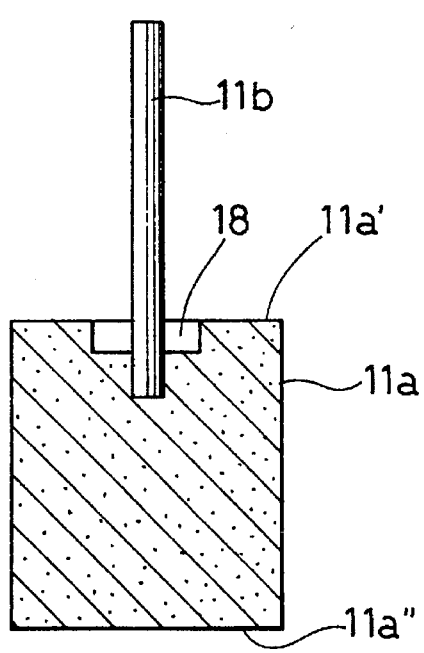
FIG. 10 is a cross-sectional view taken on line IV—IV of FIG. 9.

Specifically, when the metallic powder is hardened and shaped into the chip 11a so that the anode bar 11b protrudes from the end surface 11a' of the chip 11a as shown in FIGS. 9 and 10, the concave 18 is simultaneously formed in the end surface 11a' of the chip 11a and then, sintering is performed.

Figure 11:
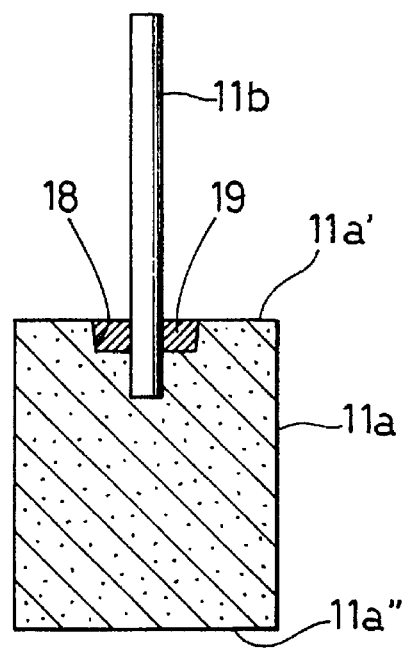
FIG. 11 is a cross-sectional view showing the condition where the synthetic resin is filled in the concave of the chip of the capacitor device.

Then, as shown in FIG. 11, the synthetic resin 19 in the form of liquid is filled in the concave 18 of the chip 11a so as to cover the root of the anode bar 11b. The synthetic resin 19 is then dried to be hardened. Like the conventional method, by drenching the chip 11a in an aqueous solution of phosphoric acid to cause anodic oxidation, a film of a dielectric substance such as tantalum pentoxide is formed on the surface of each metal powder.

Figure 12:
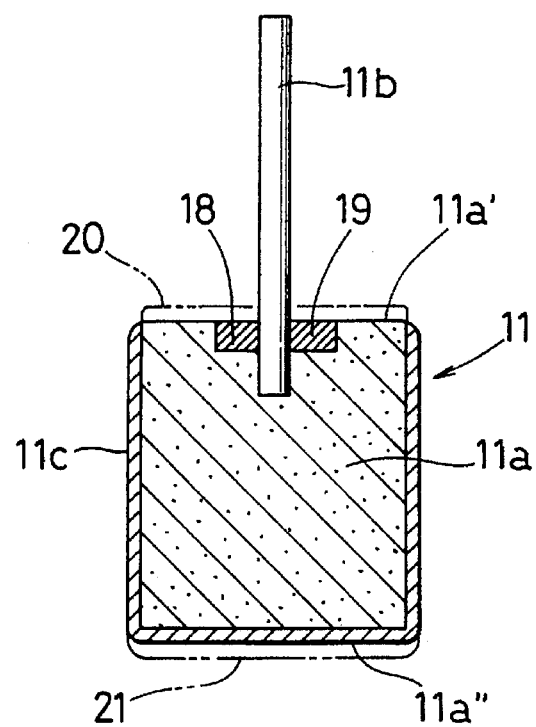
FIG. 12 is a cross-sectional view showing the condition where the cathode film is formed on the chip of the capacitor device.

Then, the chip 11a is drenched in an aqueous solution of manganese nitrate and then taken out from the solution and sintered. By repeating this a plurality of times, a layer of a solid state electrolyte such as manganese dioxide is formed on the surface of the film of a dielectric substance such as tantalum pentoxide. Then, the cathode film 11c made of a metal such as silver or nickel is formed on the surface of the chip 11a except on the end surface 11a' with a graphite film between. Thus, the capacitor device 11 as shown in FIG. 12 is manufactured.

When the chip 11a is drenched in the manganese nitrate solution to form a solid state electrolytic layer, since the water-repellent synthetic resin 19 is present, it is surely prevented that the manganese nitrate solution is infiltrated to the anode bar 11b. Even if the surface of the solution sways so that the manganese nitrate solution adheres to the surfaces of the anode bar 11b and the synthetic resin 19, when the capacitor device 11 is taken out from the solution, the manganese nitrate solution is removed from the surface of the synthetic resin 19 because of the water repellency of the synthetic resin 19. For this reason, after sintering, no manganese dioxide remains on the surface of the synthetic resin 19, so that the surface of the anode bar 11b and the solid state electrolytic layer on the surface of the chip 11a are not electrically connected.

Thus, in a solid state electrolytic capacitor of the above-described structure, no electric short circuit occurs between the anode bar 11b and the solid state electrolytic layer, so that the production of inferior capacitors is prevented. The electric short circuit is more surely prevented by increasing the area of the synthetic resin 19 by increasing the size of the concave 18 formed in the chip 11a.

On the other hand, by filling the synthetic resin 19 in the concave 18 provided in the end surface 11a' of the chip 11a, the height of protrusion of the chip 11a in the synthetic resin 19 from the end surface 11a' can be reduced or the synthetic resin 19 is prevented from protruding from the end surface 11a' of the chip 11a. Thereby, the lead terminal 12 fixed to the anode bar 11b can be arranged closer to the end surface 11a' of the chip 11a than in the conventional structure, so that a distance W between the lead terminal 12 and the end surface 11a' of the chip 11a of the capacitor device 11 is largely reduced compared to the conventional structure without the number of inferior products being increased in manufacturing the capacitor device 11.

Consequently, when a length L of the solid state electrolytic capacitor is predetermined, the length of the chip 11a of the capacitor device 11 can be increased by an amount by which the distance W between the end surface 11a and the lead terminal 12 can be reduced, so that the capacitance of the solid state electrolytic capacitor can be increased.

When the capacitance of the solid state electrolytic capacitor is predetermined, the total length L can be reduced by the amount by which the distance W between the end surface 11a' of the chip 11a of the capacitor device 11 and the lead terminal 12 is reduced, so that a reduction in size and weight of the solid state electrolytic capacitor is realized.

Figure 13:
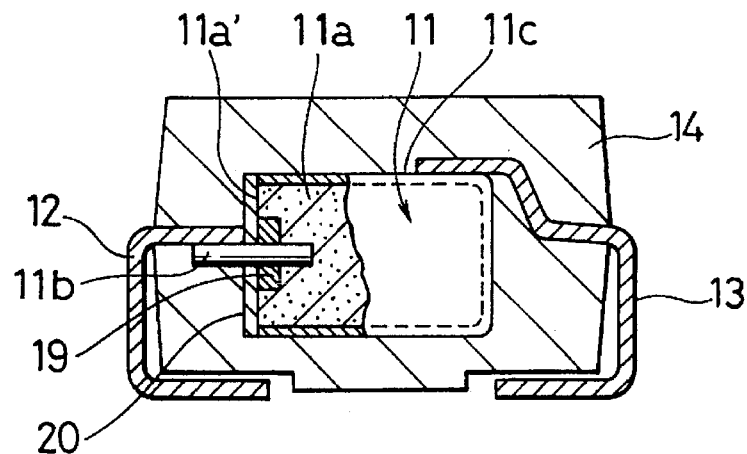
FIG. 13 is a front longitudinal sectional view of the solid state electrolytic capacitor according to a second embodiment of the present invention.

FIG. 13 shows a second embodiment. In the second embodiment, an insulating film 20 is formed by attaching a film of a synthetic resin such as fluorocarbon resin or silicon resin on the end surface 11a' of the chip 11a of the capacitor device 11 or by applying a synthetic resin such as silicon resin or epoxy resin and drying it to be hardened.

With this arrangement, the distance W can be decreased to substantially zero by arranging the lead terminal 12 to be in contact with or very close to the insulating film 20 formed on the end surface 11a' of the chip 11a, so that a further increase in capacitance of the solid state electrolytic capacitor or reduction in size and weight thereof is realized.

Figure 14:
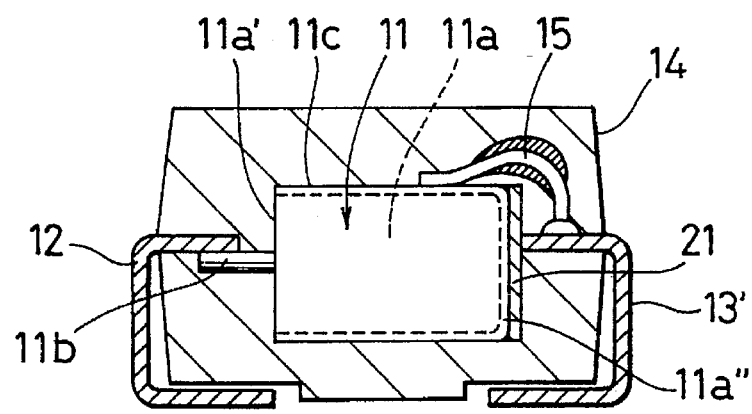
FIG. 14 is a front longitudinal sectional view of the solid state electrolytic capacitor according to a third embodiment of the present invention.

A third embodiment shown in FIG. 14 is a solid state electrolytic capacitor having a safety fuse where the cathode film 11c of the chip 11a of the capacitor device 11 and the other lead terminal 13' are connected by a safety fuse wire 15 such as a soldering wire.

In the case of the third embodiment, an insulating film 21 is formed by attaching a film of a synthetic resin such as fluorocarbon resin or silicon resin on, of the end surfaces 11a' and 11a" of the chip 11a, the other end surface 11a" opposite to the end surface 11a' from which the anode bar 11b protrudes or by applying a synthetic resin such as silicon resin or epoxy resin and drying it to be hardened.

With this structure, the distance between the other lead terminal 13' and the other end surface 11a" of the chip 11a can be decreased to substantially zero by arranging the other lead terminal 13' to be in contact with or very close to the insulating film 21 formed on the other end surface 11a" of the chip 11a, so that the increases in capacitance of the solid state electrolytic capacitor having a safety fuse or the reduction in size and weight thereof is realized.

Figure 15:
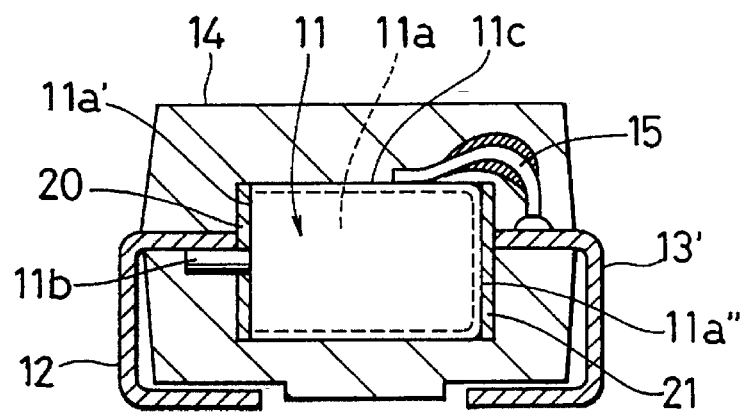
FIG. 15 is a front longitudinal sectional view of the solid state electrolytic capacitor according to a fourth embodiment of the present invention.

Further, referring to FIG. 15, there is shown a fourth embodiment which is a modification of the third embodiment. In the fourth embodiment, insulating films 20 and 21 are formed on both end surfaces 11a' and 11a" of the chip 11a of the capacitor device 11, respectively. With this structure, the distance between the lead terminal 12 and the end surface 11a' of the chip 11a can be decreased to substantially zero and the distance between the other lead terminal 13 and the other end surface 11a" of the chip 11a can be decreased to substantially zero, so that a further increase in capacitance of the solid state electrolytic capacitor having a safety fuse or a further reduction in size and weight thereof is realized.

Obviously, many modifications and variations of the present invention are possible in light of the above teachings. It is therefore to be understood that within the scope of the appended claims, the invention may be practiced other than as specifically described.

What is claimed is:

1. A solid state electrolytic capacitor comprising: a capacitor device having a porous chip formed by hardening a metal powder and an anode bar protruding from one end surface of the chip, wherein a dielectric film, a solid state electrolytic layer and a cathode film are successively formed on a surface of the chip; a first lead terminal connected to the anode bar; and a second lead terminal connected to the cathode film, wherein a concave, in which a synthetic resin is filled, is formed in the end surface of the chip, and wherein said anode bar passes through the synthetic resin to be fixed to the chip.

2. A solid state electrolytic capacitor according to claim 1, wherein an insulating film is formed on an end surface of the chip.

3. A solid state electrolytic capacitor according to claim 2, wherein said insulating film is formed on the end surface from which the anode bar protrudes.

4. A solid state electrolytic capacitor according to claim 2, wherein said chip is formed to have the first end surface from which the anode bar protrudes and a second end surface at a reverse side of the first end surface, and wherein said insulating film is formed on the second end surface.

5. A solid state electrolytic capacitor according to claim 2, wherein said chip is formed to have the end surface from which the anode bar protrudes, an end surface at a reverse side of the end surface from which the anode bar protrudes and a side surface other than the end surfaces, and wherein said insulating film is formed on each of the end surfaces, and wherein said cathode film is formed on the side surface, and wherein the first and second lead terminals are formed to be opposite to each other.

6. A solid state electrolytic capacitor comprising:

a porous chip of a rectangular parallelopiped form having a concave in its first end surface;

an insulating and water-repellent member filled in the concave;

an anode bar passing through the insulating and water-repellent member to be fixed to the chip;

a dielectric film formed on a surface of the chip;

a solid state electrolytic layer formed on a surface of the dielectric film;

a cathode film formed on a surface of the solid state electrolytic layer;

an anode lead terminal connected to the anode bar;

a cathode lead terminal connected to the cathode film; and a resin covering the chip so that a part of the anode lead terminal and a part of the cathode lead terminal are exposed.

* * * * *